Feb. 23, 1965  F. KUHRT ET AL  3,170,323

DEVICE FOR PRODUCING A TORQUE OR TORSION RESPONSIVE SIGNAL

Filed Sept. 20, 1960  2 Sheets-Sheet 1

United States Patent Office 3,170,323
Patented Feb. 23, 1965

3,170,323
DEVICE FOR PRODUCING A TORQUE OR
TORSION RESPONSIVE SIGNAL
Friedrich Kuhrt, Walter Engel, and Hans-Joachim Lippmann, all of Nurnberg, Germany, assignors to Siemens-Schuckertwerke Aktiengesellschaft, Erlangen, Germany, a corporation of Germany
Filed Sept. 20, 1960, Ser. No. 57,330
Claims priority, application Germany, Sept. 30, 1959,
S 65,229
9 Claims. (Cl. 73—136)

This invention relates to an apparatus for sensing or indicating a stress or strain, such as in a system under load, particularly a rotational system. It further relates to an apparatus which senses the degree of torsion or twist in an elongated member, such as the drive shaft of an automobile under load.

An object of the invention is to provide a device capable of accurate sensing and measurement of the degree of twist in a shaft or other body rotating under load, and in consequence sensing and measuring the load on the shaft.

Another object of the invention is to provide a device capable of sensing the degree of twist or torsion or torque in an elongated rotating body that is power driven at one portion and under load at a point axially removed therefrom.

Other objects will be obvious upon a study of the following description and the accompanying drawing in which.

Figure 2:
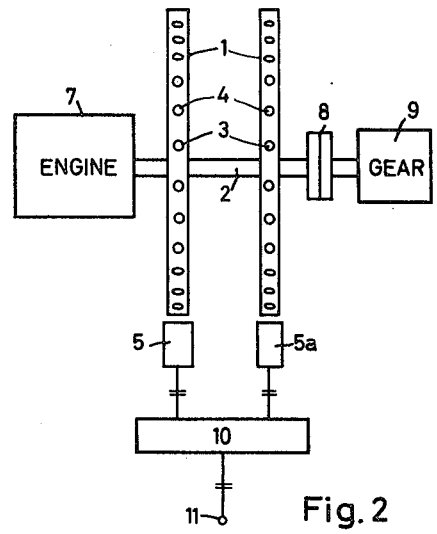
FIG. 2 illustrates two such carrier discs mounted on a common engine shaft.
Figure 3:
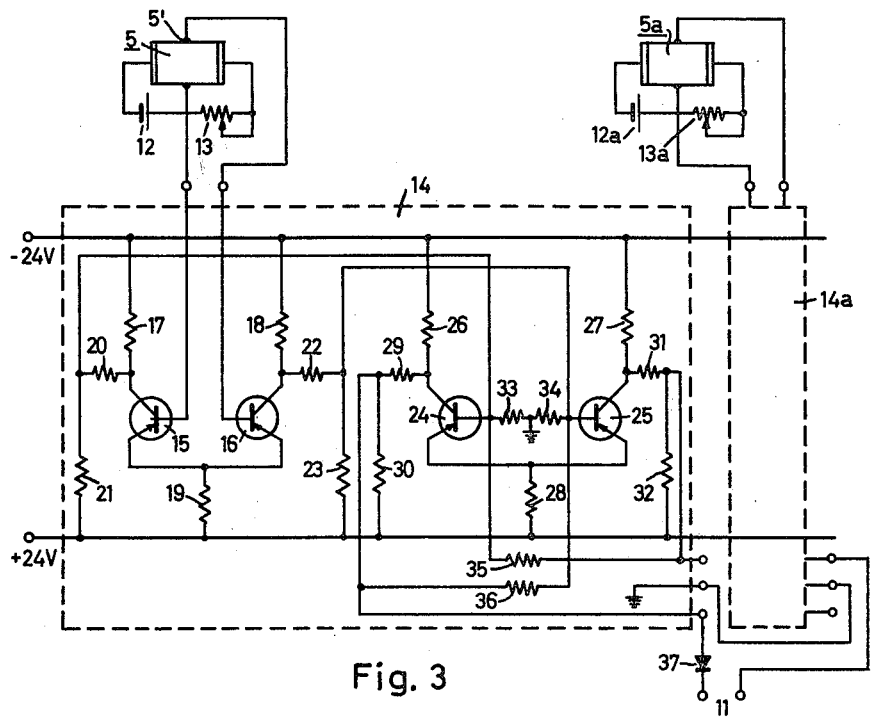
Figure 4:
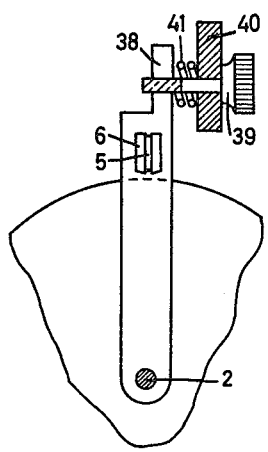
Figure 5:
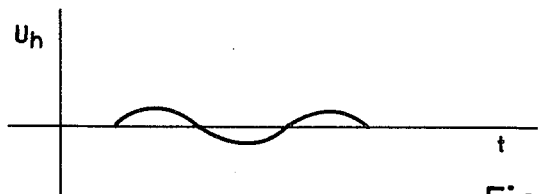
Figure 6:
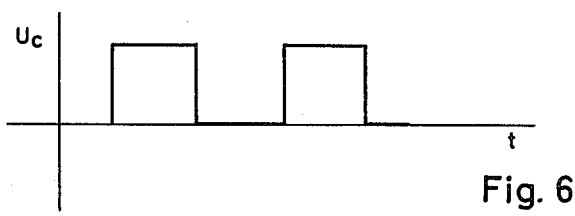
Figure 7:
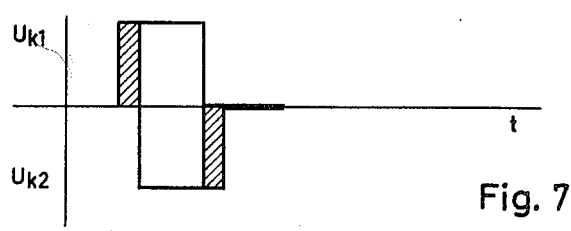

FIG. 3 presents details of circuitry applicable in the arrangement illustrated in FIG. 2;

FIG. 4 is a detail illustrating the adjustable mounting of one of the Hall plates;

FIGS. 5, 6, 7 illustrate the generated voltages at various stages.

Figure 1:
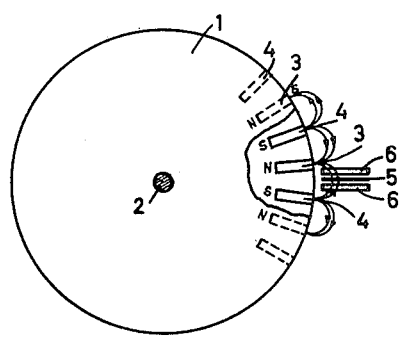
FIG. 1 illustrates a shaft, a magnetic rotary carrier disc on the shaft, and a juxtaposed semiconductor Hall generator plate, forming the sensing means.

Illustrated in FIG. 1 is a pulse disc 1 of nonmagnetic material, for example light metal, which is fastened to the shaft 2 driven by the engine 7. The pulse disc comprises, on its outer periphery, a plurality of permanent magnet pins 3 and 4 of alternately different polarity, embedded in the disc, and disposed radially. The outer pole faces (N or S) are flush with the peripheral surface of the discs 1. This produces a stray magnetic flux between the poles of adjacent magnet pins 3 and 4, as schematically illustrated on the drawing.

A Hall-voltage generating semiconductor plate 5 is mounted in the stray flux at a distance of approximately 1 mm. The plate 5 is fixed, and is so oriented that it is traversed by the stray flux in a direction transverse and preferably perpendicular to the plane of the plate. For concentrating the stray flux upon the Hall plate, the plate is bedded between two correspondingly dimensioned plates 6 of ferrite.

When the pulse disc is in rotation together with the shaft, and the Hall plate is energized by an adjustable constant control current 12–13 (FIG. 3), a transverse Hall voltage is generated at the Hall electrodes 5' whose amplitude is independent of the rotating speed, but whose frequency depends upon the rotating speed and is proportional thereto.

Although it is more advantageous and convenient to rotate the magnet carrier disc, it is feasible to mount the Hall plate on a ring or arm carried by and rotating with shaft 2. In such case, the magnet carrier disc would be replaced by an annular member, and the magnets would be carried on the inner annular space of the carrier.

Other arrangements are possible, viz. the magnets may have their magnetic axes extend parallel to the axis of rotation of shaft 2, less advantageously.

For producing a torque-responsive control signal, two identical devices are employed, each according to FIG. 1. As shown in FIG. 2, two pulse discs 1 are firmly secured upon the engine shaft 2 between the engine 7 and the clutch 8 with the gearing 9. The corresponding two Hall-voltage generators 5 and 5a impose the respective Hall voltages upon the rectifier phase bridge 10.

The direct voltage appearing at the output terminals 11 of the bridge network 10 is proportional to the distortion angle of the shaft between the two pulse discs, and hence is proportional to the torsion of the shaft, and thus also to the torque transmitted thereby, because the phase difference between the two Hall voltages is dependent upon torsion.

A requirement for such performance is to give the two pulse discs the same numbers of magnet pins, and to position the respective Hall generators at an equal distance from like poles of the respective next adjacent magnet pins when the shaft is at a standstill.

For this purpose, one of the two Hall generators is preferably made adjustable relative to the appertaining pulse disc and relative to the other Hall generator, this being effected, for example, by means of a micrometer set screw 39 and spring 41 (FIG. 4). The Hall plate 5 is fixed on a pivot arm 38. Part 40 is stationary with respect to the axis of shaft 2.

The direct voltage at the output terminal of the rectifier bridge 10 is then available as the above-mentioned electric control signal.

FIG. 3 illustrates one form the circuitry of rectifier bridge 10 may assume. This bridge contains two Hall-generator matching stages, to which Hall-generator trigger stages are respectively connected. These can be purchased as complete circuit components from Siemens-Schuckertwerke A.G., Erlangen, Germany. These stages have the following trade designations:

Hall-generator adapter or matching stage: N–495–HA
Hall-generator trigger stage: N–495–HC The voltages issuing from the two Hall generators 5, 5a, and having quasi-sinusoidal wave shape, are supplied to the respective Hall-generator adapter or matching stages from which they are issued to bi-stable trigger amplifiers. The trigger amplifiers issue a retcangular-wave voltage, which is already considerably higher than the original Hall voltage.

FIG. 5 illustrates the output voltage $U_h$ of each Hall generator versus time.

FIG. 6 illustrates the output voltage $U_c$ of the bi-stable trigger amplifier versus time.

When a torque is transmitted by the shaft, the voltages of the two Hall generators and the rectangular-wave amplified voltages of the trigger amplifier are phase-displaced relative to each other. These two voltages are connected in series opposition, as illustrated in FIG. 7.

Due to this voltage opposition, only the diagonally hatched voltage configuration remains. The energy content of the rectangular-wave alternating voltage is proportional to the torque. By rectification, for example by half-wave rectification as illustrated, a direct voltage is obtained which is proportional to the torque. Consequently, the voltage at the output terminals 11 of the rectifier is proportional to the torque.

FIG. 3 shows at 14 the adapter or matching stage and the trigger connected with each other. The adapter stage comprises two transistors 15 and 16 with respective collector resistors 17 and 18 and a common emitter resistor 19. The Hall voltage of the Hall plate 5 is impressed upon the respective base electrodes of the two transistors. Connected between the collector of transistor 15 and the common emitter resistor 19 is a voltage divider composed of two resistors 20 and 21. A corresponding voltage divider, composed of resistors 22 and 23, is connected between the collector of transistor 16 and the common emitter resistor 19. The output signals of the adapter stage are issued from these two voltage dividers to the trigger stage which comprises two transistors 24 and 25. The circuitry of the trigger stage, in principle, corresponds to that of the adapter stage, except that feedback paths are added consisting of base-circuit resistors 33, 34 and feedback resistors 35, 36. The elements 26 to 32 in the trigger stage correspond respectively to elements 17 to 23 in the adapter stage. The degree of feedback coupling is so dimensioned that the transistors 24 and 25 have only two stable operating conditions and hence operate jointly as a bi-stable trigger amplifier. The adapter stage and trigger stage are designed as push-pull amplifiers in order to have each signal available with any desired polarity.

Connected to the second Hall plate 5a is a corresponding adapter stage and a trigger stage, jointly designated by 14a. The internal circuitry is identical with that of the device 14. The grounded terminals of the two trigger stages are connected with each other. The output voltages $U_{k1}$ and $U_{k2}$ of mutually opposed polarities are connected in series opposition with each other through a diode 37. As a result, the curve shape of FIG. 7 is obtained.

Although it is more advantageous to do so, the discs need not be provided with separate permanent magnets, but may comprise magnetizable material of sufficient remanence so that the necessary magnetic disc continuities of alternating magnetic polarity can be produced by correspondingly magnetizing the carrier plate or portions of the plate. Such materials and operation would be similar to the performance of a magnetic tape recorder in which magnetic signals (discontinuities) are produced by correspondingly magnetizing a layer or coating of suitable ferromagnetic material.

While the invention is particularly applicable as a measuring gauge for the torque on an engine shaft or other power-transmitting shaft, it has general utility for determining the torsion of machine parts and for determining and controlling torque for various other purposes, such as for the load-responsive control and regulation of the driving speed of elevators, rolling stairways, and other hoisting or conveying plants.

We claim:

1. An apparatus for sensing small differences in rotational displacements of rotating parts of a rotating system, comprising two members each operatively connected for rotation with one of said rotating parts, said members each having a plurality of magnetized regions distributed discontinuously circumferentially thereof at uniform distances, semiconductor Hall voltage generator plates respectively mounted near the travel paths of said members to be subjected to the magnetic fields of said regions during rotation of said parts, said Hall plates forming part of a magnetic circuit having a gap transverse to the direction of rotation of said members, the Hall plates having Hall voltage electrode means, circuit connections to said Hall voltage electrode means to take off the respective Hall voltages, the gaps being each located at the same distance from the respective travel paths of said members, the circumferential spacing of the magnetized regions of the two members being the same, the angular relationship between the magnetized regions of the respective members being preset, and comparator means to sense the degree of relative displacement of the current pulses derived from the Hall plates.

2. The apparatus defined in claim 1, the Hall plates being embedded between ferrite plates, the large area faces of the plates extending at a right angle to the direction of the magnetic stray flux between adjacent magnet pins, the plate being stationarily mounted with respect to the periphery of the disc.

3. The apparatus defined in claim 1, each member comprising a non-magnetic disc body, the magnetized regions being formed by a plurality of permanent magnets of sequentially alternating polarity.

4. An apparatus for sensing small differences in rotational displacements of rotating parts of a rotating system, comprising two members each operatively connected for relative rotation displacement with respect to one of said rotating parts, said members each having a plurality of magnetized regions distributed discontinuously circumferentially thereof at uniform distances, semiconductor Hall voltage generator plates respectively mounted near the relative displacement paths of said members to be subjected to the magnetic fields of said regions during rotation of said parts, said Hall plates forming part of a magnetic circuit having a gap transverse to the direction of rotation of said members, the Hall plates having Hall voltage electrode means, circuit connections to said Hall voltage electrode means to take off the respective Hall voltages, the gaps being each located at the same distance from the respective travel paths of said members, the circumferential spacing of the magnetized regions of the two members being the same, the angular relationship between the magnetized regions of the respective members being preset, and comparator means to sense the degree of relative displacement of the current pulses derived from the Hall plates.

5. The apparatus defined in claim 4, each member comprising a non-magnetic disc body which carries a multiplicity of permanent magnet pins of sequentially alternating polarity which are distributed uniformly about the disc periphery and which individually extend radially.

6. An apparatus for sensing differences in rotational displacements of axially spaced parts of a rotating body, comprising two members each fixedly mounted on axially spaced parts of said body for rotation therewith, said members each having a plurality of magnetized regions distributed discontinuously circumferentially thereof at uniform distances, semiconductor Hall voltage generator plates respectively mounted near the travel paths of said members to be subjected to the magnetic fields of said regions during rotation of said parts, said Hall plates forming part of a magnetic circuit having a gap transverse to the direction of rotation of said members, the Hall plates having Hall electrode means, circuit connections to said Hall electrode means to take off the respective Hall voltages, the gaps being each located at the same distance from the respective travel paths of said members, the circumferential spacing of the magnetized regions of the two members being the same, the angular relationship between the magnetized regions of the respective members being preset, and comparator means to sense the degree of relative displacement of the current pulses derived from the Hall plates.

7. The apparatus defined in claim 6, each member comprising a non-magnetic disc body, the magnetized regions being formed by a plurality of permanent magnets of sequentially alternating polarity.

8. A system comprising a power source, a power transmitting rotating body operatively connected to the power source for rotation thereby and a load connected to said transmitter body, in combination: an apparatus for sensing differences in rotational displacements of axially spaced parts of the rotating body, comprising two members each fixedly mounted on axially spaced parts of said body for rotation therewith, said members each having a plurality of magnetized regions distributed discontinuously circumferentially thereof at uniform distances, semiconductor Hall voltage generator plates respectively mounted near the travel paths of said members to be subjected to the magnetic fields of said regions during rotation of said parts, said Hall plates forming part of a magnetic circuit having a gap transverse to the direction of rotation of said members, the Hall plates having Hall electrode means, circuit connections to said Hall electrode means to take off the respective Hall voltages, the gaps being each located at the same distance from the respective travel paths of said members, the circumferential spacing of the magnetized regions of the two members being the same, the angular relationship between the magnetized regions of the respective members being preset, and comparator means to sense the degree of relative displacement of the current pulses derived from the Hall plates, said differences in rotational displacement being correlative with the torque and therefore with the load, so that said sensed differences are correlative with the load.

9. A system comprising a power source, a power transmitting rotating body operatively connected to the power source for rotation thereby and a load connected to said transmitter body, in combination: an apparatus for sensing differences in rotational displacements of axially spaced parts of the rotating body, comprising two members each fixedly mounted on axially spaced parts of said body for rotation therewith, said members each having a plurality of permanent magnets of sequentially alternating polarity distributed circumferentially thereof at uniform distances, the magnetic axes of the magnets extending radially, semiconductor Hall voltage generator plates respectively mounted near the travel paths of said members to be subjected to the magnetic fields of said regions during rotation of said parts, said Hall plates forming part of a magnetic circuit having a gap transverse to the direction of rotation of said members, the Hall plates having Hall electrode means, circuit connections to said Hall electrode means to take off the respective Hall voltages, the gaps being each located at the same distance from the respective travel paths of said members, the large area faces of the plates extending at a right angle to the direction of the magnetic stray flux between adjacent magnets, the circumferential spacing of the magnetized regions of the two members being the same, the angular relationship between the magnetized regions of the respective members being preset, and comparator means to sense the degree of relative displacement of the current pulses derived from the Hall plates, said differences in rotational displacement being correlative with the torque and therefore with the load, so that said sensed differences are correlative with the load.

References Cited in the file of this patent

UNITED STATES PATENTS

| | | |
|---|---|---|
| 1,958,043 | Heintz | May 8, 1934 |
| 2,279,690 | Lindsey | Apr. 14, 1942 |
| 2,346,976 | Langer et al. | Apr. 18, 1944 |
| 2,511,846 | Halpert | June 20, 1950 |
| 2,512,325 | Hansen | June 20, 1950 |
| 2,675,700 | Van Degrift et al. | Apr. 20, 1954 |
| 2,725,046 | Wilder | Nov. 29, 1955 |
| 2,842,108 | Sanders | July 8, 1958 |
| 2,946,219 | Kemper | July 26, 1960 |